Figures 1, 2:
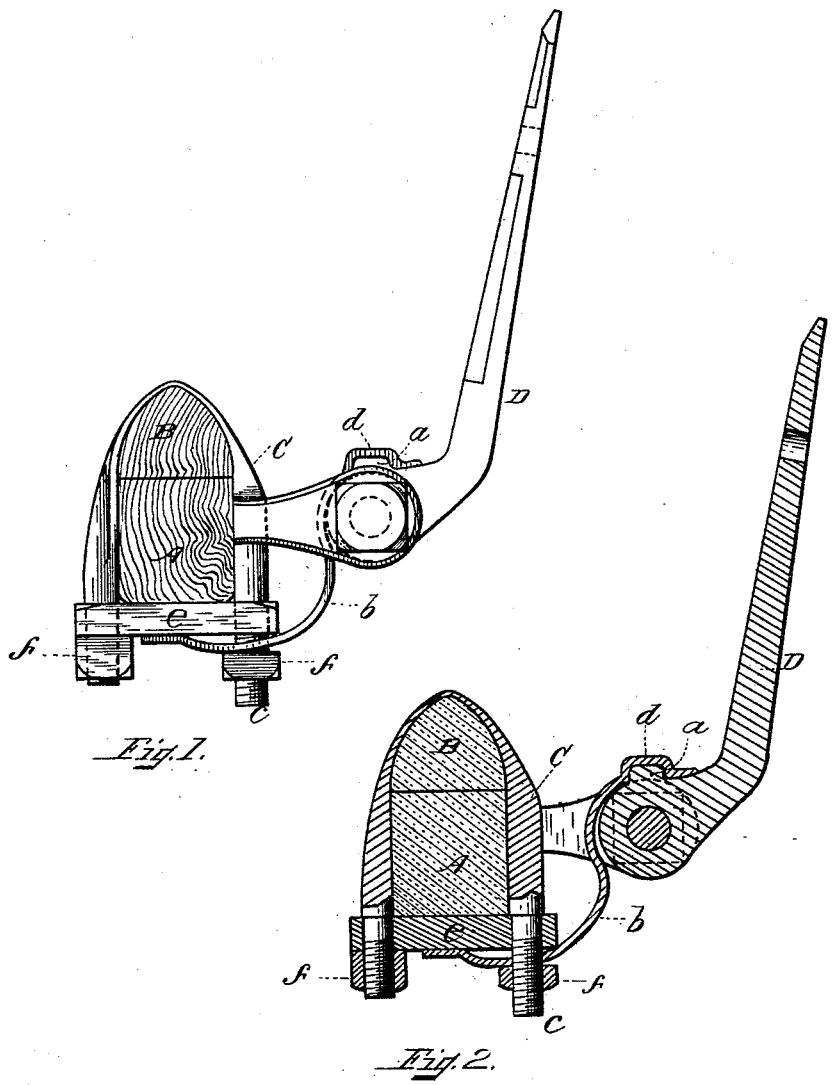

(No Model.)

B. F. LEWIS.
THILL COUPLING.

No. 500,101. Patented June 20, 1893.

Witnesses:
Eugene Humphrey
Ralph W. E. Hopper

Inventor:
Benjamin F. Lewis
per T. W. Porter Atty.

THE NORRIS PETERS CO., PHOTO-LITHO., WASHINGTON, D. C.

United States Patent Office.

BENJAMIN F. LEWIS, OF AMESBURY, MASSACHUSETTS, ASSIGNOR TO CHARLES W. LONG, OF SAME PLACE.

THILL-COUPLING.

SPECIFICATION forming part of Letters Patent No. 500,101, dated June 20, 1893.

Application filed December 12, 1892. Serial No. 454,933. (No model.)

*To all whom it may concern:*

Be it known that I, BENJAMIN F. LEWIS, of Amesbury, in the county of Essex and State of Massachusetts, have invented a new and useful Improvement in Shaft-Shackles, which will, in connection with the accompanying drawings, be hereinafter fully described, and specifically defined in the appended claim.

In said drawings Figure 1 is a side elevation of a shaft shackle secured to the axle, the draft eye, and my anti-rattler thereto applied; and Fig. 2 shows the same parts partly in cross section.

The object of my invention is two-fold; first to provide an anti-rattler which will by its elastic contact with the shackle prevent the same from becoming loose and noisy and which can be adjusted as desired; and second, to provide means that will automatically serve to hold the shafts in an elevated position when the wagon is detached from the horse and the shafts have been raised above the position that they occupy when the horse was thereto harnessed. And the invention will be next herein described in connection with the drawings, and will then be defined in the appended claim.

Referring again to said drawings, A represents the axle, B the axle stock, C the shackle, and D the draft eye. These several parts, with one exception, are of usual construction. Said exception to usual construction consists in a projection $a$, raised above the perforated eye of D and formed integral therewith. Upon the bolt like portion $c$ of the shackle, I arrange the spring $b$ which passing up past the draft eye is formed with an offset $d$, into which part $a$ can enter, as shown. Part $b$ is shown as standing off somewhat from yoke $e$ against which nuts $f$ act to secure the shackle in place on the axle. The purpose of so forming spring $b$ is that as the shackle, draft eye and pivot bolt become gradually worn, then by tightening up the nut that holds said spring in place, the tension thereon is renewed and it continues to hold the parts from rattling. When the shafts are in position in the harness upon the horse, part $d$ of the spring and part $a$ of the eye are not in contact; but when the horse is unharnessed and the shafts are somewhat raised so as to be out of the way, then said parts interlock and so hold the shafts raised till it is again desired to harness the horse to the vehicle, when by merely drawing down upon the shafts parts $d\ a$ become separated and the spring then acts only as an anti-rattler.

Instead of having part $b$ raised as shown at $d$ with a projection on part D, the latter may be formed with a depression and part $b$ be formed to fit therein; but I prefer the construction shown instead of an equivalent therefor.

I claim as my invention and desire to secure by Letters Patent—

An anti-rattler consisting of spring $b$ arranged to act against the draft eye of the shackle and formed with a take up or adjustment between yoke $e$ and nut $f$, whereby its pressure upon eye D may be regulated as described.

BENJAMIN F. LEWIS.

Witnesses:
EUGENE HUMPHREY,
RALPH W. E. HOPPER.